Figure 1:
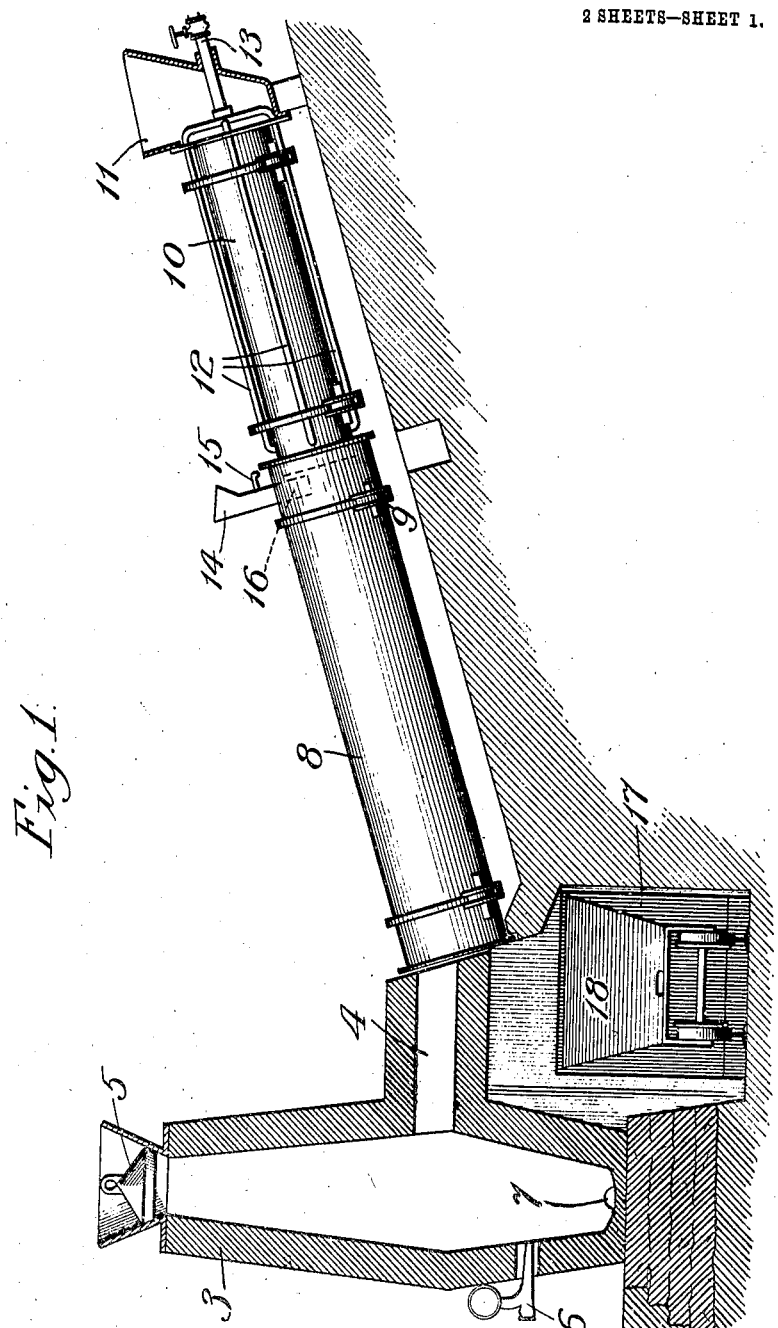

No. 890,563. PATENTED JUNE 9, 1908.
J. T. JONES.
METHOD OF TREATING COPPER ORES.
APPLICATION FILED FEB. 6, 1908.

2 SHEETS—SHEET 1.

Witnesses:
Inventor:
John T. Jones.

No. 890,563. PATENTED JUNE 9, 1908.
J. T. JONES.
METHOD OF TREATING COPPER ORES.
APPLICATION FILED FEB. 6, 1908.

2 SHEETS—SHEET 2.

Witnesses:
Inventor:
John T. Jones.

UNITED STATES PATENT OFFICE.

JOHN T. JONES, OF IRON MOUNTAIN, MICHIGAN, ASSIGNOR OF ONE-HALF TO GEORGE A. ST. CLAIR, OF DULUTH, MINNESOTA.

METHOD OF TREATING COPPER ORES.

No. 890,563.   Specification of Letters Patent.   Patented June 9, 1908.

Application filed February 6, 1908. Serial No. 414,527.

*To all whom it may concern:*

Be it known that I, JOHN T. JONES, a citizen of the United States, residing at Iron Mountain, in the county of Dickinson and State of Michigan, have invented a new and useful Improvement in Methods of Treating Copper Ores, of which the following is a specification.

My invention relates to an improved method of extracting and saving the copper contents of certain copper-bearing ores and more especially those ores in which the copper occurs in the form of oxids, carbonates or sulfids, or in two or more such forms, and is associated with iron in one or more such forms, as well as earthy substances.

It has been usual hitherto to treat such ores in a smelting furnace by melting all the constituents thereof to the fluid state to cause them to separate according to their specific gravities. This treatment made necessary the subjection of the mass of ore for a prolonged time to a temperature sufficient to liquefy the most refractory constituent.
My object is to improve upon the method, hitherto practiced as described, of treating copper ores of the general class mentioned for the purpose of greatly simplifying and rendering more economic the extraction and saving of the proper content.

My method involves, first, the subjection of the ore under confinement to the action of a suitable reducing gas at a temperature sufficient, and for a time necessary, to reduce all the metallic constituents to the metallic state without, however, rendering fluid either the metal or earthy constituents; and thereafter subjecting the ore thus reduced to a temperature which will melt and render fluid the copper, or copper and all the earthy constituents but not the iron. During the first or reducing step the iron oxids, to a more or less large extent, are reduced to metal, and the metallic iron is rendered more or less soft whereby its particles agglomerate together forming a more or less honeycombed structure in the pores of which and adhering thereto are the globules or particles of reduced copper and the slag-making material. In case the ore is not sufficiently self-fluxing, a suitable proportion of lime or other fluxing material should be mixed with the stock to provide slag-making material which will fuse at a temperature well below that necessary to melt the metallic iron, though it may require a higher melting temperature than the copper constituent.

For the purpose of carrying out my improved method on a commercial scale, a furnace, or series of furnaces, must necessarily be provided, which may be of any construction suitable for the purpose.

In the accompanying drawings I illustrate two furnace structures for carrying on in succession the two main steps of my method, and while these illustrations will serve to render clear the description of my invention, as I prefer to practice it, there is no intention to limit the scope of my improvements to the employment of any particular type of apparatus.

Figure 2:
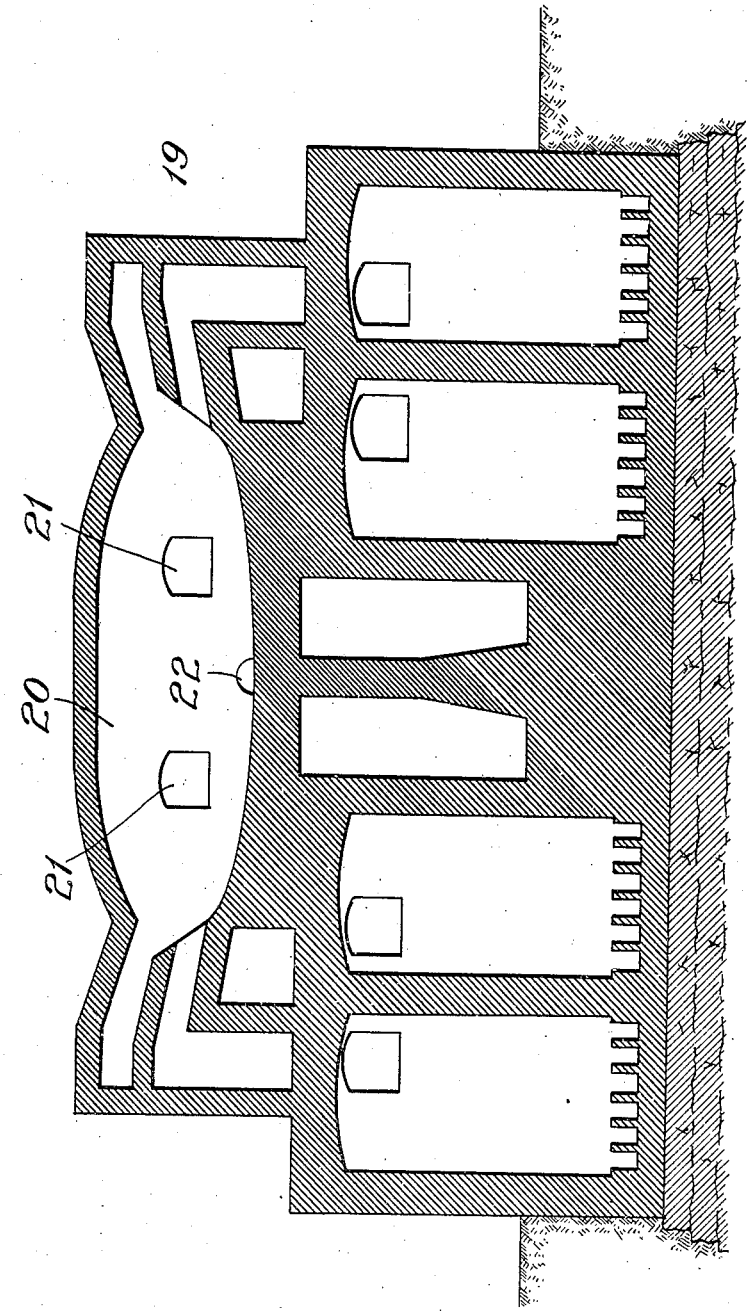

Referring to the drawings, Figure 1 is a view, partly in section and partly in elevation, of a furnace structure devised for carrying out the reducing step; and Fig. 2 a section of an open-hearth furnace of a common construction in which the second main step of my method may be practiced.

3 is a coal-burning furnace in which the reducing gas is generated and from which it is discharged through a flue 4. The coal is fed through a bell-valve 5 at the top and blast is supplied through a twyer 6. The unvolatilized products of combustion are withdrawn as they accumulate through an outlet 7.

8 is a rotary inclined cylinder abutting gastight against the structure 3. It is open at its lower end to receive the gases discharged through the flue 4. The cylinder 8 has means not shown for rotating it and may rest on rollers 9 in a common manner.

10 is a second cylinder or elongation of the cylinder 8, the joint between the two being gas tight. Surrounding the upper end of the cylinder 10 is a hopper structure 11 and communicating with the lower end-portion of the cylinder 10 are air-inlet pipes 12 leading from a common supply-pipe 13. On the cylinder 8 near its upper end is a hopper 14 provided with a valve 15 and communicating with a pipe 16 which terminates about the axial center of the cylinder.

In practice, the cylinder 8 may be a hundred or more feet in length and the cylinder 10 of the same length or somewhat shorter. The ore to be treated is fed into the hopper 11 either in lump form or otherwise, and in the rotation of the cylinders moves slowly downward to the lower end of the cylinder 8. The volatile products of combustion from the furnace 3 move upward through the cylinders and discharge at the hopper 11. The said hot products of combustion constituting a reducing gas mingle with air entering or forced into the cylinder 10 through the pipes 12 and the ore, as it moves through the cylinder 10, is subjected to an oxidizing temperature which serves to heat the ore to a high degree and roast off a large percentage at least of any sulfur content. As the ore thus preheated and more or less desulfurized moves through the cylinder 8 it is subjected to the reducing gas at a temperature approximating, say, from 1200° F. to 1600° F. which is sufficient to suitably deoxidize the ore without fusing the metals or earthy matter. As the ore nears the lower end of the cylinder the deoxidized iron particles naturally agglomerate and each lump of the ore will become a honeycombed or sponge structure with particles or globules of copper and earthy constituents, such as silica, alumina, lime, etc., as well as any unreduced iron oxids incorporated therewith or adhering thereto.

To facilitate the reducing action in the cylinder 8 a comparatively small quantity of bituminous coal may be occasionally fed into the cylinder 8 through the valved hopper 14 to mix with the ore and undergo a distilling process which will cause fresh volatile hydrocarbons to mix with the ore as it descends.

Beneath the flue 4 I show a chamber or pit 17 into which the ore is discharged from the lower end of the cylinder 8. This pit is capable of receiving a car 18 which may be moved quickly into and out of the same to stand beneath the outlet end of the cylinder 8 and receive the ore as it is discharged therefrom. Means should be provided for preventing the entrance of any material quantity of air to the pit which, by mingling with the reducing gas in the cylinder 8, would tend to materially affect their reducing action. It will be understood that the ore discharged into the car 18 is more or less thoroughly reduced, and substantially all the metallic contents are in metallic form.

19 (Fig. 2) is a regenerative furnace of a common type having the open-hearth melting-chamber 20. The chamber 20 is maintained at a temperature of, say, from 2000° F. to 2200° F., the temperature-supplying gases being of a neutral nature in their action upon ore smelted in the hearth in the sense of being neither oxidizing nor reducing. The chamber 20 is provided with doors 21 and a tap-hole 22.

When the car 18 is filled, as described, it is withdrawn from the pit 17 and the reduced ore therein covered with coal-dust, or the like, to shield it from the oxidizing action of air. The contents of the car are charged into the furnace 20 and there subjected to the temperature therein which is maintained at the degree necessary, as stated, to melt the copper and slag making materials, but insufficient to render fluid the metallic iron. As the copper and slag making material become fluid it runs out of the honeycombed iron, and as the copper is heavier than the slag the two separate by gravity. When all or nearly all the copper has run out of the metallic iron the latter may be raked out through the doors 21. The copper and slag are tapped out through the opening 22.

Nearly all of the copper contents of the original ore may be extracted by my method described, and saved in a very pure condition.

What I claim as new and desire to secure by Letters Patent is—

1. The method of treating ore containing copper and iron in non-metallic form to recover the copper, which consists in first subjecting the ore under reducing conditions to a temperature that will reduce metal producing constituents to a metallic state, and thereupon subjecting the reduced ore to a higher temperature sufficient to render fluid the copper constituent without melting the metallic iron constituent and causing the said constituents to separate from each other.

2. The method of treating ore containing earthy matter and iron and copper in non-metallic form to recover the copper, which consists in first subjecting the ore under reducing conditions to a temperature that will reduce metal producing constituents to a metallic state, and thereupon subjecting the reduced ore to a higher temperature sufficient to render fluid the copper and slag making constituents without melting the metallic iron constituent and causing the molten constituents to separate from the iron and from each other.

JOHN T. JONES.

In presence of—
A. U. THORIEN.
R. A. SCHAFER.